US005633456A

United States Patent [19]
Stander

[11] Patent Number: 5,633,456
[45] Date of Patent: May 27, 1997

[54] ENGINE MISFIRE DETECTION WITH DIGITAL FILTERING

[75] Inventor: Douglas M. Stander, Grosse Pointe Woods, Mich.

[73] Assignee: Chrysler Corporation, Auburn Hills, Mich.

[21] Appl. No.: 511,125

[22] Filed: Aug. 4, 1995

[51] Int. Cl.$^6$ .................................................. G01M 15/00
[52] U.S. Cl. .................... 73/116; 123/436; 364/431.07
[58] Field of Search .................................... 73/116, 117.2, 73/117.3, 115; 123/436; 364/431.07

[56] References Cited

U.S. PATENT DOCUMENTS

| | | | |
|---|---|---|---|
| 3,908,366 | 9/1975 | Masaki | 73/117.3 |
| 4,179,922 | 12/1979 | Bouverie et al. | 73/116 |
| 4,186,701 | 2/1980 | Suzuki et al. | 123/119 A |
| 4,271,811 | 6/1981 | Suzuki et al. | 123/571 |
| 4,308,519 | 12/1981 | Garcea et al. | 340/53 |
| 4,461,257 | 7/1984 | Hosaka et al. | 123/419 |
| 4,488,528 | 12/1984 | Morikawa | 123/425 |

(List continued on next page.)

OTHER PUBLICATIONS

FIR Windowed Filter Design Program—Window, L. R. Rabiner and C. A. McGonegal, pp. 5.2–1 through 5.2–19 (date unknown).

*Primary Examiner*—George M. Dombroske
*Attorney, Agent, or Firm*—Mark P. Calcaterra

[57] ABSTRACT

An apparatus and method are provided for detecting cylinder misfires in an internal combustion engine of a motor vehicle by digitally filtering out noise-related signals to improve the signal to noise ratio. Crankshaft rotation is sensed and crankshaft velocities are measured for each cylinder. Changes in angular velocity are determined and correspond to each of a plurality of cylinder firing events. A window of consecutive changes in angular velocity are used with a digital filter. The digital filter contains filter coefficients which are determined from a frequency analysis for a given engine by distinguishing between actual misfire events and noise related event frequencies. From the analysis a cut off frequency between actual misfires and noise is determined which is then used to determine the filter coefficients. The digital filter generates a filter output for the current cylinder firing event and the filter output is preferably multiplied by a gain to provide a compensated filter output. The compensated filter output is compared to a threshold value and a misfire event is determined for the selected cylinder based on the comparison. A high pass filter may be employed to filter out low frequency noise-related signals such as those associated with a power train bobble. Similarly, a low pass filter can be used to filter out high frequency noise signals such as those associated with crankshaft torsional vibrations. Both high and low pass filters could be employed in the alternative by using a high pass filter at low engine speeds and a low pass at high engine speeds.

19 Claims, 12 Drawing Sheets

U.S. PATENT DOCUMENTS

| | | | |
|---|---|---|---|
| 4,491,110 | 1/1985 | Bone et al. | 123/425 |
| 4,532,592 | 7/1985 | Citron et al. | 364/431.05 |
| 4,562,818 | 1/1986 | Kohama et al. | 123/478 |
| 4,606,224 | 8/1986 | Tedeschi et al. | 73/117.3 |
| 4,716,874 | 1/1988 | Hilliard et al. | 123/425 |
| 4,782,692 | 11/1988 | Peden et al. | 73/117.3 |
| 4,846,129 | 7/1989 | Noble | 73/115 |
| 4,862,093 | 8/1989 | Jiewertz | 324/464 |
| 4,886,029 | 12/1989 | Lill et al. | 123/479 |
| 4,928,228 | 5/1990 | Fujimoto et al. | 364/431.09 |
| 4,930,479 | 6/1990 | Osawa et al. | 123/436 |
| 4,930,481 | 6/1990 | Fujimoto et al. | 123/481 |
| 4,932,379 | 6/1990 | Tang et al. | 73/117.3 |
| 4,936,277 | 6/1990 | Deutsch et al. | 123/436 |
| 4,941,445 | 7/1990 | Deutsch | 123/414 |
| 4,976,241 | 12/1990 | Ishida et al. | 73/117.3 |
| 4,987,771 | 1/1991 | Iwata | 73/117.3 |
| 5,021,960 | 6/1991 | Manaka et al. | 364/431.01 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,117,681 | 6/1992 | Dosdall et al. | 73/116 |
| 5,144,927 | 9/1992 | Denz | 123/425 |
| 5,200,899 | 4/1993 | Ribbens et al. | 73/117.3 |
| 5,231,869 | 8/1993 | Klenk et al. | 73/116 |
| 5,239,473 | 8/1993 | Ribbens et al. | 73/117.3 |
| 5,278,760 | 1/1994 | Ribbens et al. | 364/431.01 |
| 5,313,075 | 5/1994 | Tierman et al. | 364/508 |
| 5,349,864 | 9/1994 | Park et al. | 73/724 |
| 5,361,629 | 11/1994 | McCombie | 73/117.3 |
| 5,369,989 | 12/1994 | Gates, Jr. et al. | 73/115 |
| 5,383,350 | 1/1995 | Bennett et al. | 73/117.3 |
| 5,387,253 | 2/1995 | Remboski, Jr. et al. | 73/117.3 |
| 5,392,641 | 2/1995 | McCombie | 73/117.3 |
| 5,394,744 | 3/1995 | James et al. | 73/117.3 |

| $\dot{\omega}_{(n-8)}$ | $\dot{\omega}_{(n-7)}$ | $\dot{\omega}_{(n-6)}$ | $\dot{\omega}_{(n-5)}$ | $\dot{\omega}_{(n-4)}$ | $\dot{\omega}_{(n-3)}$ | $\dot{\omega}_{(n-2)}$ | $\dot{\omega}_{(n-1)}$ | $\dot{\omega}_{(n)}$ | [Changes In Angular Velocity] |
|---|---|---|---|---|---|---|---|---|---|
| 4 | 2 | 1 | 3 | 4 | 2 | 1 | 3 | 4 | [Cylinder Identification] |

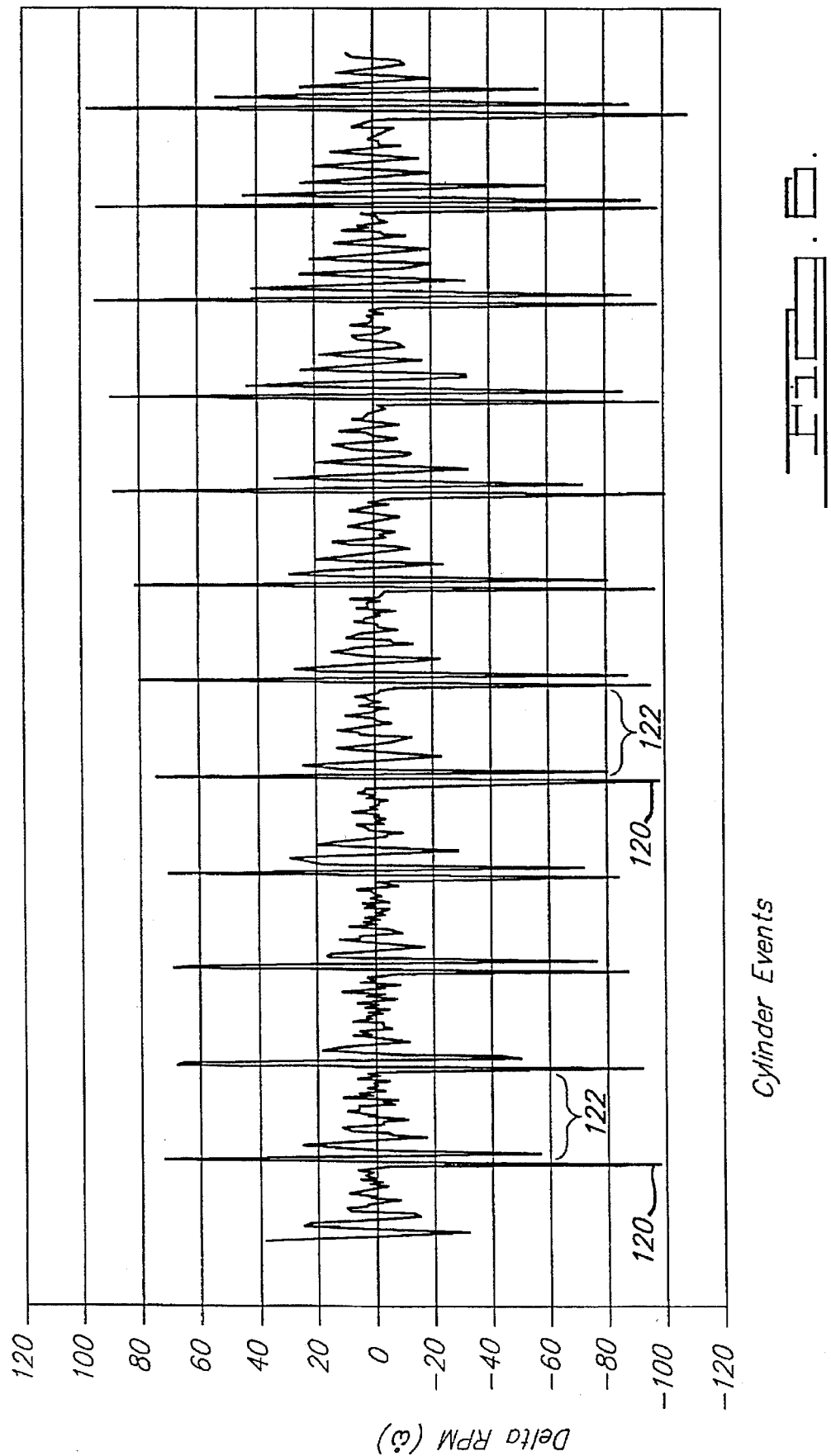

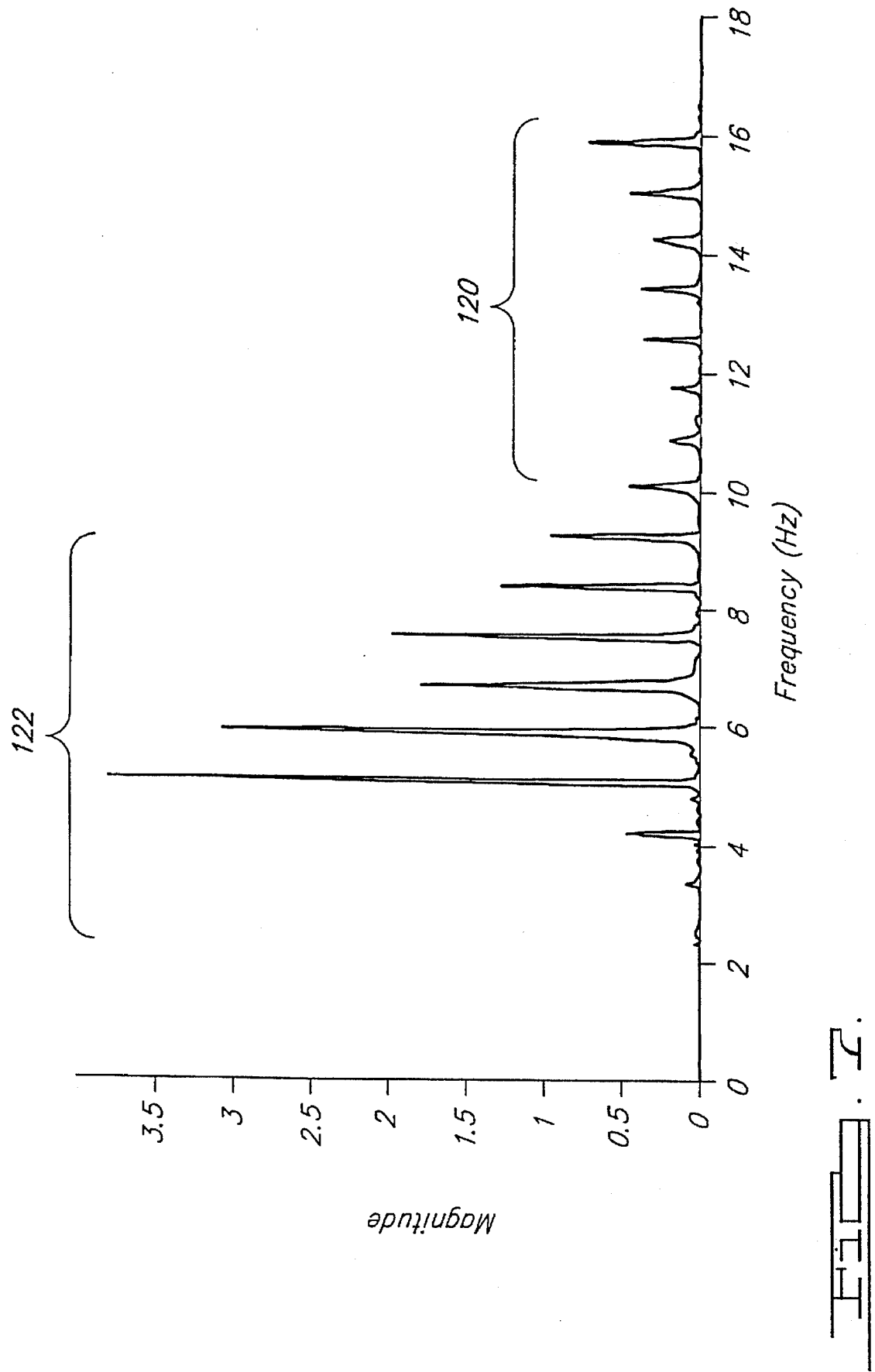

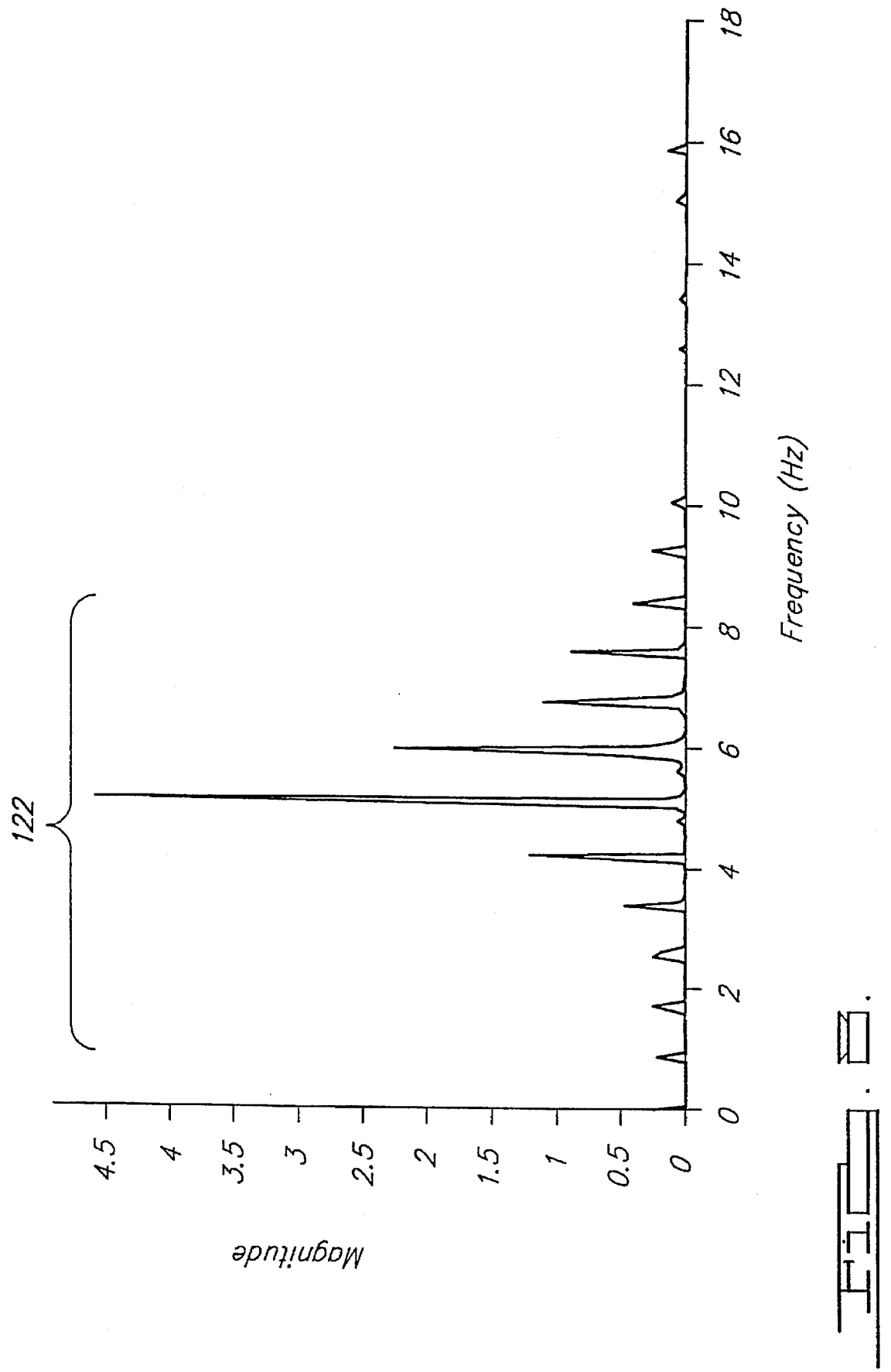

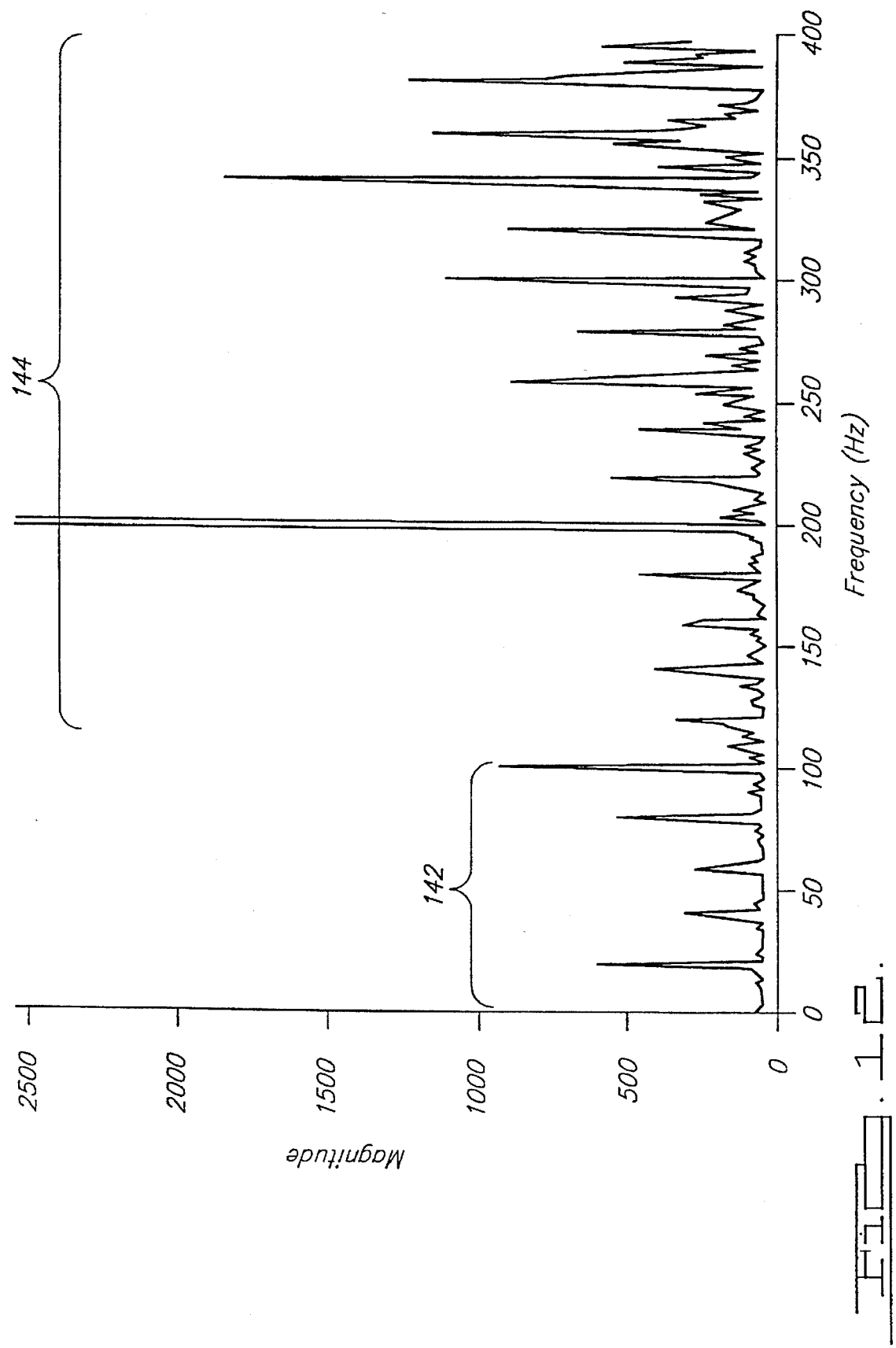

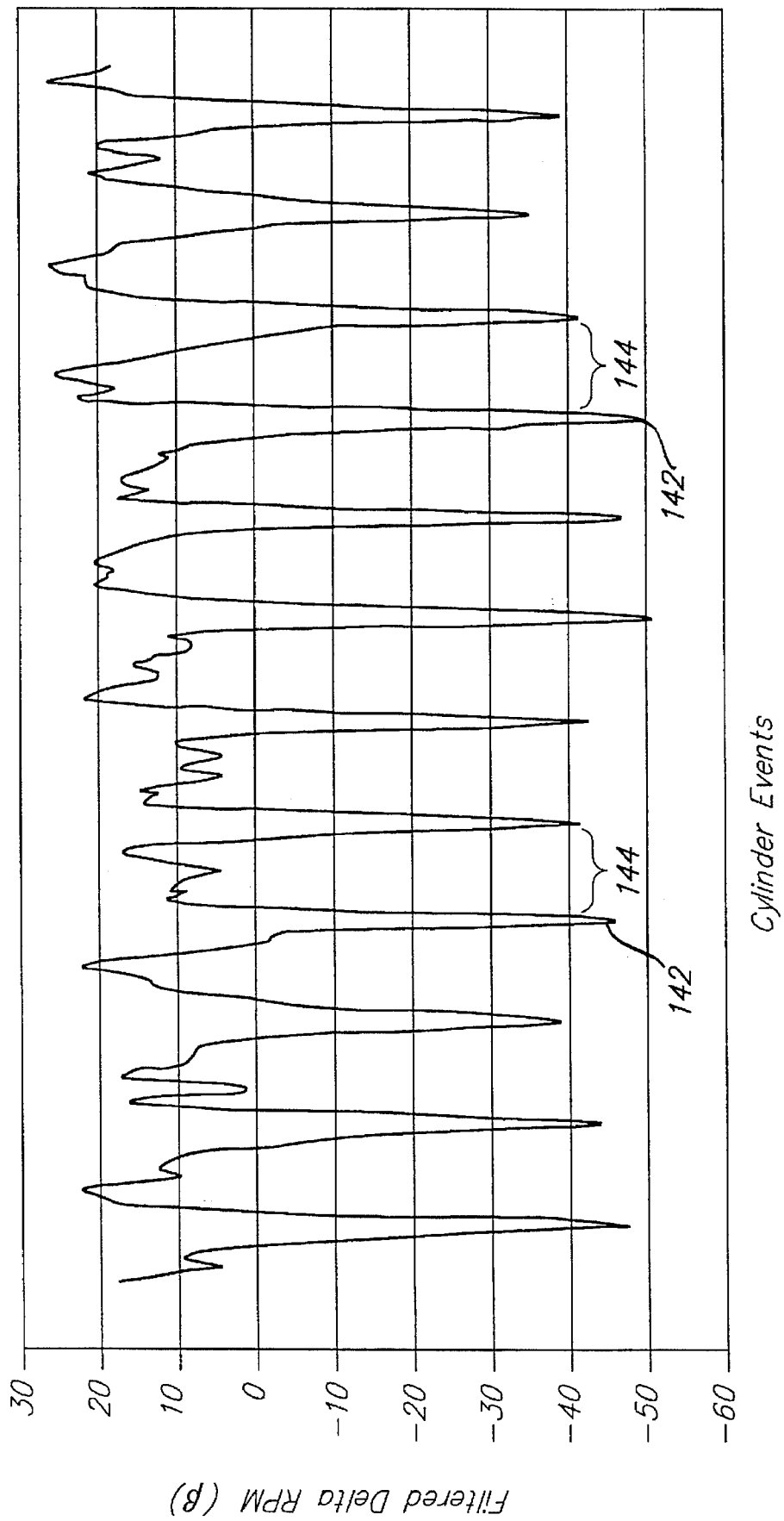

ENGINE MISFIRE DETECTION WITH DIGITAL FILTERING

BACKGROUND OF THE INVENTION

1. Technical Field

The present invention relates generally to internal combustion engines and, more particularly, to a misfire detection apparatus and method with digital filtering to reduce noise-related effects and improve signal to noise ratio for detecting misfire of individual cylinders in an internal combustion engine.

2. Discussion

Pollution control legislation has required motor vehicle manufacturers to reduce exhaust emissions of carbon monoxide, hydrocarbons, and oxides of nitrogen from motor vehicles. To comply with the legislative requirements, most motor vehicle manufacturers generally use catalytic converters on production vehicles to control such exhaust emissions. A catalytic converter typically includes a catalyst and operates at a very high temperature in order to burn unwanted byproducts of combustion so as to reduce hydrocarbons, carbon monoxide and nitrous oxide. However, increased amounts of unburned byproducts that often remain after the occurrence of an engine misfire can lead to damage of the catalytic converter.

More recently, regulatory agencies have proposed that passenger, light-duty and medium-duty motor vehicles with feedback fuel control systems be equipped with a malfunction indicator function that will inform the motor vehicle operator of any malfunction of an emission-related component that interfaces with an on-board computer of the motor vehicle. It is also proposed or required that an on-board diagnostic system identify the likely area of malfunction. Proposals or requirements have set forth catalyst, misfire, evaporative purge system, secondary air system, air conditioning system refrigerant, fuel system, oxygen sensor, exhaust gas recirculation, and comprehensive component monitoring requirements.

As previously mentioned, misfire of internal combustion engines can cause damage to the catalyst of a catalytic converter. With respect to misfire, the identification of the specific cylinder experiencing misfire may be required. Some regulations provide that the motor vehicle manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a durability demonstration motor vehicle to fail a Federal Test Procedure (FTP) by more than 150% of the applicable standard if the degree of misfire were present from the beginning of the test; and (3) the degree of misfire evaluated in a certain number of revolution increments which would cause a durability demonstration motor vehicle to fail an inspection and maintenance (IM) program tailpipe exhaust emission test.

Current and proposed future regulations are also requiring that motor vehicle manufacturers be able to provide information detailing the occurrence of misfires such as identifying which cylinders are responsible for one or more misfires. The misfire information need be collected and stored in memory so that the stored information may be downloaded at a service center and used to determine the cause of misfires in the vehicle. One misfire detection and identification approach is disclosed in issued U.S. Pat. No. 5,361,629 issued Nov. 8, 1994 and titled "Single Sensor Misfire Detection Apparatus and Method for an Internal Combustion Engine". The above-cited patent is hereby incorporated by reference. The misfire detection approach in the above-cited patent senses rotation of a crankshaft and calculates a crankshaft velocity based on the sensed rotation. The calculated crankshaft velocity changes or a compensated velocity change is compared to a predetermined crankshaft velocity range to determine if misfire occurred.

More recent misfire detection approaches are disclosed in pending U.S. patent application Ser. No. 08/468,117, filed Jun. 6, 1995, entitled "Engine Misfire Detection with Compensation for Normal Acceleration of Crankshaft", U.S. patent application Ser. No. 08/469,040, filed Jun. 6, 1995, entitled "Engine Misfire Detection with Rough Road Inhibit", and U.S. patent application Ser. No. 08/468,113, filed Jun. 6, 1995, entitled "Engine Misfire Detection with Cascade Filter Configuration". The aforementioned applications are commonly assigned to the assignee of the present application and are hereby incorporated by reference. The above referenced approaches generally teach misfire detection which includes sorting a plurality of changes in angular velocity over a predetermined series of cylinder firings and averaging the two middle-most angular velocity changes to provide an average change in velocity value. A deviation is determined between the change in angular velocity for a selected cylinder and the average change in velocity value. Misfires are detected as a function of a comparison of the deviation with a threshold value.

A number of conventional approaches are generally susceptible to detecting a false misfire which is really a disturbance caused by a previous misfire. This is often referred to as a misfire induced power train bobble. Additionally, some misfire detection approaches can be tricked into falsely identifying noise, which can be generated by crankshaft torsional vibrations, as a misfire. For example, high engine speed can cause large torsional vibrations that would signal a false misfire detection. Excessive amounts of noise can cause difficulties in detecting occurrences of actual misfires.

In particular, the above-incorporated U.S. application Ser. No. 08/469,040 entitled "Engine Misfire Detection with Rough Road Inhibit" inhibits misfire detection upon detecting noise related events such as a rough road condition. Using this inhibit technique results in a period of time over which misfire detection is deactivated. The inhibit time periods can become quite extensive, at certain operating conditions, especially at low engine speeds and high manifold pressures. While such an approach may be effective to avoiding false misfire detection, it may be preferable to realize continuous misfire detection without the occurrence of inhibit time periods. Accordingly, it is desirable to provide for a misfire detection apparatus and method which would allow for continuous misfire detection, despite the presence of noise-related events.

It is therefore one object of the present invention to provide for a misfire detection apparatus and method of continuously detecting cylinder misfires in an internal combustion engine which effectively reduces or eliminates noise-related events.

It is another object of the present invention to provide for a misfire detection apparatus and method which removes noise signals and achieves enhanced signal to noise ratio to better distinguish actual misfires from noise-related events.

It is a further object of the present invention to provide for a misfire detection apparatus and method which distinguishes misfire induced power train bobble effects from actual misfires.

It is yet another object of the present invention to provide a misfire detection apparatus and method which distinguishes high frequency noise events such as crankshaft torsional vibrations from actual misfires.

SUMMARY OF THE INVENTION

To achieve the foregoing objectives, the present invention is a digital filtering apparatus and method for detecting misfire in individual cylinders of an internal combustion engine of a motor vehicle. The apparatus and method of the present invention advantageously filters out noise-related signals to achieve an enhanced signal to noise ratio for detecting cylinder misfires. Crankshaft rotation is sensed and crankshaft velocities are measured for each expected cylinder firing event. Changes in angular velocity are determined which correspond to each of a plurality of cylinder firing events and a window of consecutive changes in angular velocity are taken. Digital filtering is used to digitally filter out noise related events so as to enhance the signal-to-noise ratio. Preferably, with an X order finite impulse response (FIR) filter, X+1 consecutive changes in angular velocity are employed with filter coefficients. The filter coefficients are determined from a frequency analysis for a given engine by distinguishing between actual misfire events and noise related events. From the frequency analysis, a cut-off frequency is determined which is then used to determine the filter coefficients for the digital filter that are necessary to filter out noise related signals.

According to one embodiment, low frequency noise, such as bobble-induced noise, is distinguished from actual misfires and the low frequency bobble-induced noise is filtered out. To remove low frequency bobble induced noise, a high pass filter is preferably employed to allow the higher frequency misfire events to pass through while filtering out lower frequency bobble effects. The filtered output is preferably multiplied by a gain and then compared to a threshold value and a misfire event is determined for the selected cylinder based on the comparison. Preferably, the threshold value is determined by engine speed and manifold pressure.

According to a second embodiment, a low pass filter could be employed so as to filter out high frequency noise-related signals such as noise caused by crankshaft torsional vibration, while allowing lower frequency misfire events to pass through. According to the second embodiment, the high pass filter is used at low engine speeds where bobble effects are more prevalent and the low pass filter is used at high engine speeds where torsional vibrations and other similar noise related events are more prevalent. The filtered output from either filter is multiplied by a gain and compared to a threshold value and a misfire event is determined for the selected cylinder based on the comparison.

BRIEF DESCRIPTION OF THE DRAWINGS

Other objects and advantages of the present invention will become apparent to those skilled in the art upon reading the following detailed description and upon reference to the drawings in which:

FIG. 6 illustrates a signal representing changes in angular velocity without the digital filtering of the present invention;

FIG. 7 illustrates power spectral density showing bobble-related noise signals and actual misfire caused signals;

FIG. 9 illustrates a signal representing changes in angular velocity obtained with the digital filtering of the present invention;

FIG. 12 illustrates power spectral density showing actual misfire events and torsional vibration-related noise handled in accordance with the alternate embodiment of the present invention; and FIG. 13 illustrates a signal representing change in angular velocity obtained with the digital filtering of the alternate embodiment.

DETAILED DESCRIPTION OF THE PREFERRED EMBODIMENTS

Figure 1:
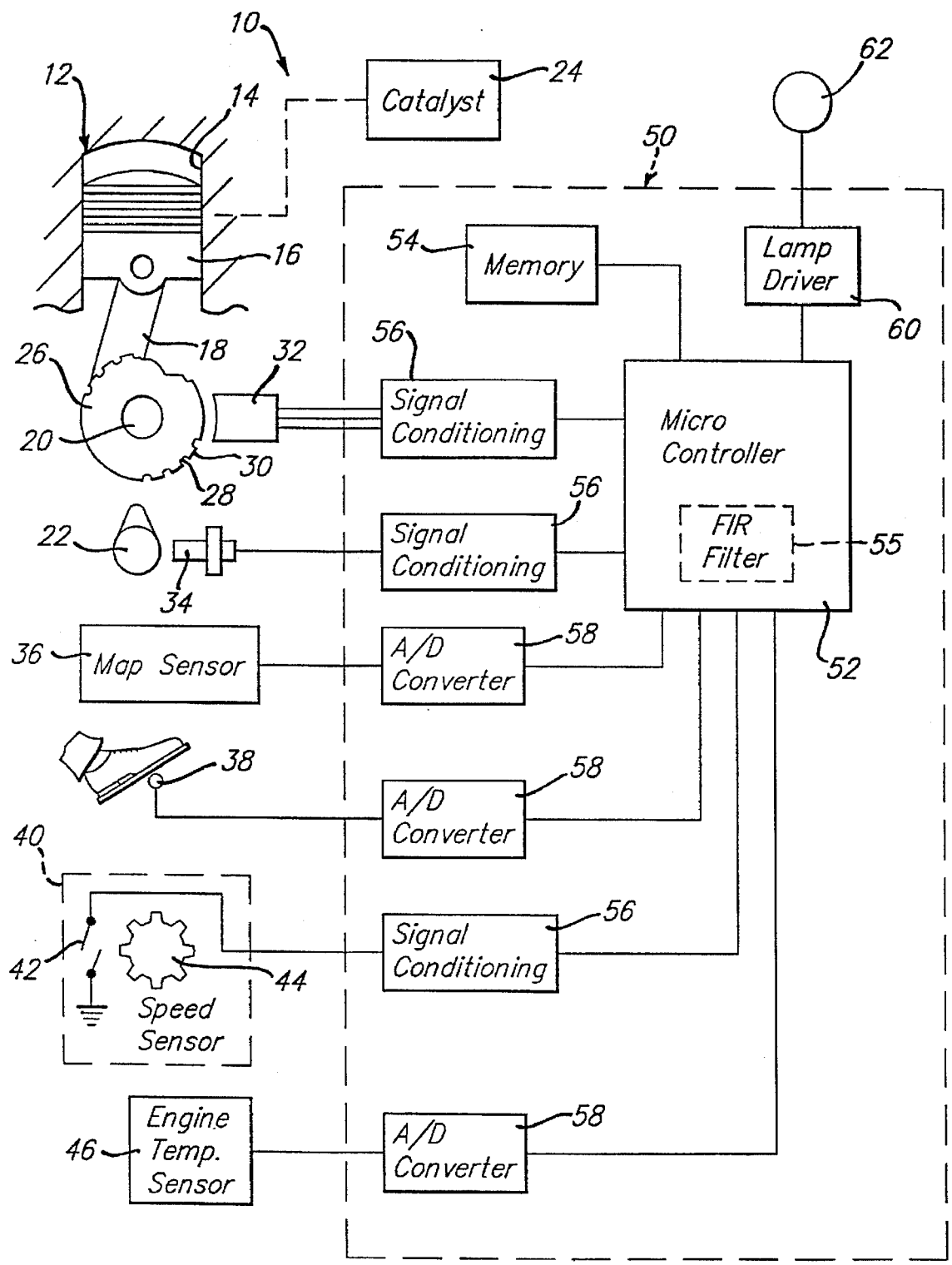
FIG. 1 is an overall block diagram illustrating a misfire detection apparatus according to the present invention.

Turning now to FIG. 1, an overall block diagram illustrating the misfire detection apparatus 10 according to the present invention is shown therein. The misfire detection apparatus 10 is used on an internal combustion engine indicated by reference numeral 12, of a motor vehicle (not shown). A partial cutaway view of engine 12 is shown illustrating one of a multiple of cylinders 14 in the engine 12. As illustrated, a piston 16 is disposed in the cylinder 14 and is operatively connected by a connecting rod 18 to a crankshaft 20. A camshaft 22 is used to open and close at least one valve (not shown) of the cylinder 14 for various strokes of the piston 16. The piston 16 is illustrated in the expansion (power) stroke of a four stroke engine. In such a four stroke engine, the strokes include intake, compression, expansion (power), and exhaust. During the exhaust stroke, exhaust gases flow from the cylinder 14 via at least one valve and through the exhaust system (not shown). Although the preferred embodiment of apparatus 10 shows a four stroke engine, the apparatus 10 can also be applied to other internal combustion engines, such as a two stroke engine. It should also be appreciated that the apparatus 10 can also be applied to any spark-ignited or diesel engine. It should be appreciated that a spark plug is present in the preferred embodiment, although it is not illustrated herein. Additionally, a catalyst 24 of a catalytic converter (not shown) is illustrated pictorially as part of the exhaust system.

The misfire detection apparatus 10 further includes a sensor target 26 operatively connected to the crankshaft 20. The sensor target 26 has at least one, and preferably a plurality of trip points, which in the preferred embodiment are provided as slots 28, formed by teeth 30. The apparatus 10 also includes a crankshaft sensor 32 for communication with the sensor target 26 and a camshaft sensor 34 for communication with the camshaft 22. The misfire detection apparatus 10 further includes a manifold absolute pressure (MAP) sensor 36, throttle sensor 38, a vehicle speed sensor 40 and an engine temperature sensor 46. The outputs of the sensors 36, 38, 40 and 46 communicate with an engine control unit, generally indicated by 50.

The engine control unit 50 includes a microcontroller 52, memory 54, signal conditioning circuitry 56 and analog-to-digital (A/D) converters 58 to process outputs from the various sensors according to the misfire detection methodology to be described hereinafter. The outputs of crankshaft sensor 32, camshaft sensor 34, and vehicle speed sensor 40 communicate with the microcontroller 52 via appropriate signal conditioning circuitry 56 which is particularized to the type of sensor employed. The output of the MAP sensor 36, throttle position sensor 38 and engine temperature sensor 46 communicate with the microcontroller 52 via the A/D converters 58. The engine control unit 50 also includes a lamp driver 60, which takes the output of the microcontroller 52 and drives an output display such as an indicator light or driver warning lamp 62. Memory 54 is a generic memory which may include Random Access Memory (RAM), Read Only Memory (ROM) or other appropriate memory. It should also be appreciated that the engine control unit 50 also includes various timers, counters and like components for use with the misfire detection methodology.

Additionally, the microcontroller 52 is configured to include or provide a finite impulse response (FIR) digital filter 55. Digital filter 55 is preferably a finite impulse response (FIR) filter designed as an X order filter. The X order digital filter 55 generally includes X+1 filter coefficients which are predetermined and preferably programmed into the microcontroller 52 and memory 54. While an FIR digital filter 55 is shown and described herein, it is conceivable that an infinite impulse response (IIR) filter could alternately be employed without departing from the spirit of this invention.

Figures 2, 4:
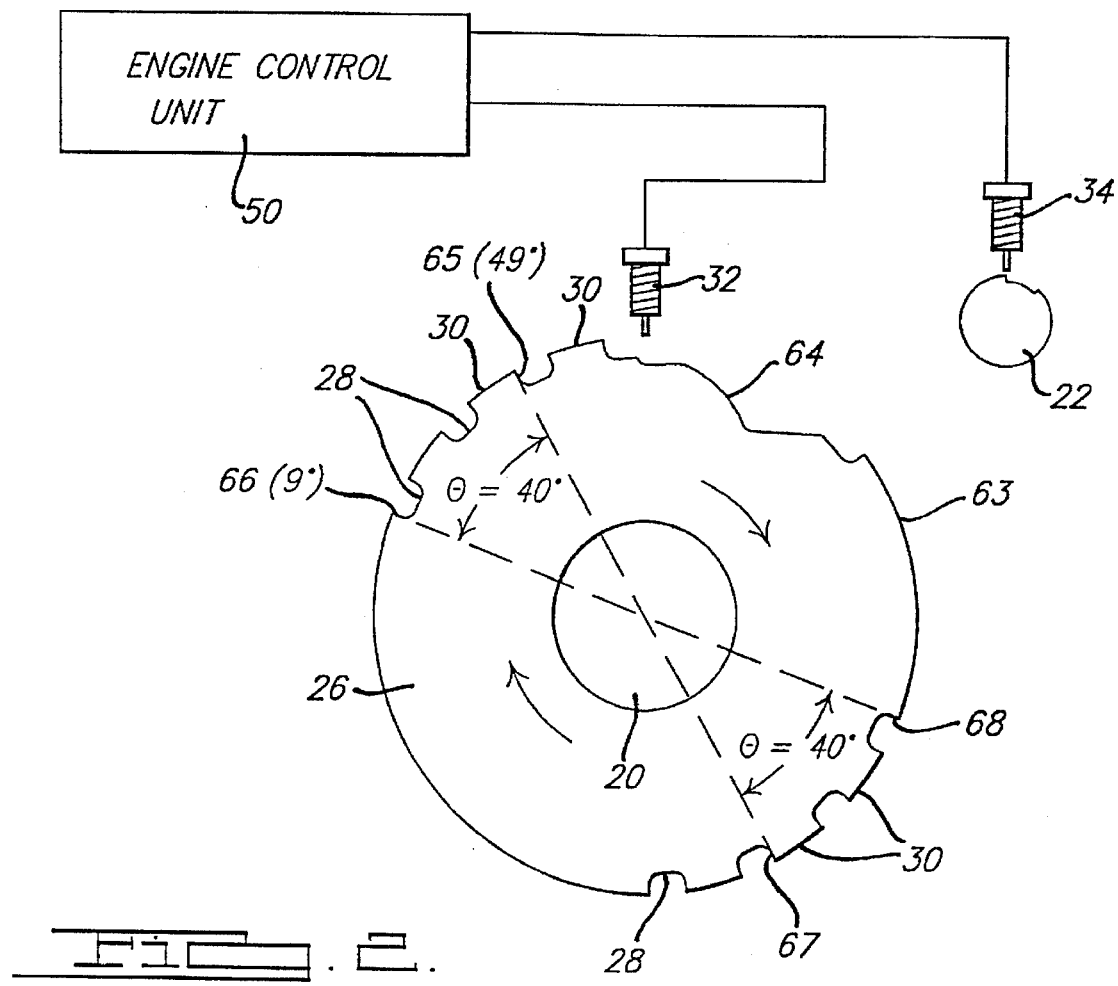
FIG. 2 is a pictorial diagram illustrating an engine crankshaft and camshaft for providing measurements for use with the misfire detection apparatus of FIG. 1.
FIG. 4 illustrates a series of consecutive changes in angular velocity measurements as selected for an X order filter.

Referring to FIG. 2, a pictorial diagram illustrating the crankshaft 20, camshaft 22, sensor target 26, crankshaft sensor 32 and camshaft sensor 34 in communication with the engine control unit 50 is provided for the misfire detection methodology. According to one embodiment, the sensor target 26 is formed by slots 28 which are cut into a counterweight 63. The counterweight 63 is attached to or incorporated on a pulley or wheel (not shown) such as by welding, although other suitable means may be employed to securely fasten the counterweight 63 to the wheel. The wheel, in turn, is affixed to and driven by the crankshaft 20.

According to one embodiment of a four-cylinder engine, the engine 12 has four cylinders 14 oriented into a straight line configuration, resulting in a one hundred eighty degree (180°) expansion stroke for each cylinder 14. The firing order for the four cylinders 14 is 1 3 4 2. Crankshaft velocity measurements are taken by measuring the amount of time expired over an angular displacement θ for a forty degree (40°) interval of the expansion stroke for each cylinder 14 of the engine 12. Preferably, the forty degree (40°) interval is near the end of the expansion stroke. As illustrated in FIG. 2, a signature slot 64 is cut into the counterweight 63 such that a first edge 65 is a forty-nine degree (49°) edge. At least one slot 28 is cut in the counterweight 63 after the first edge 65 has formed a second edge 66 at a nine degree (9°) edge. Other slots 28 may also be cut in the counterweight 63 between the first and second edges 65 and 66 for use for ignition timing or other purposes. It should be appreciated that the first edge 65 identifies the starting location for measuring velocity corresponding to cylinder numbers 1 and 4 of the cylinders 14.

The sensor target 26 includes at least two other slots 28 to form a third edge 67 and a fourth edge 68 opposite or one hundred eighty degrees (180°) from the first edge 65 and second edge 66, respectively. Optionally, other slots 28 may also be cut in the flange 63 between the third and fourth edges 67 and 68 for use for ignition timing or other purposes. It should be appreciated that the third edge 67 identifies the starting location for measuring velocity corresponding to cylinder numbers 3 and 2 of the cylinders 14. It should also be appreciated that the third edge 67 is a forty-nine degree (49°) edge and the fourth edge 68 is a nine degree (9°) edge.

According to another embodiment, a six-cylinder engine (not shown) has six cylinders in an overlapping configuration resulting in a one hundred twenty degree (120°) expansion stroke for each cylinder 14 of engine 12. For the six-cylinder engine, crankshaft velocity measurements are preferably taken over an angular displacement θ for a sixty degree (60°) interval of the expansion stroke. The sixty degree (60°) interval is measured from a sixty-nine degree (69°) edge and a nine degree (9°) edge. While four-cylinder and six-cylinder engines are described herein, it should be appreciated that the present invention applies to various other size multi-cylinder engines and other various overlapping cylinder configurations.

The crankshaft sensor 32 is used to measure position markings, namely edges 65–68 on sensor target 26, for use in determining crankshaft velocity. The crankshaft sensor 32 is mounted near the sensor target 26 and is located so that when aligned with edges 66 and 68 a falling edge will occur at nine degrees (9°) before piston top dead center (TDC). In one embodiment, the crankshaft sensor 32 may be a hall effect sensor. It should also be appreciated that other sensors such as optical sensors or variable reluctance sensors may also be used according to other embodiments.

The camshaft sensor 34 is used to identify specific cylinder firings. Since the camshaft 22 rotates 360° for every 720° of rotation of crankshaft 20, identification of a given cylinder can be determined. Such identification will assist in pinpointing exactly what cylinder or cylinders are misfiring. Although the preferred embodiment uses a stock cam sensor and algorithm to determine top dead center (TDC) of the number 1 cylinder, cylinder identification techniques may vary with different engines. It should also be understood that the camshaft sensor 34 and camshaft 22 are conventional components generally known in the art.

Figure 3:
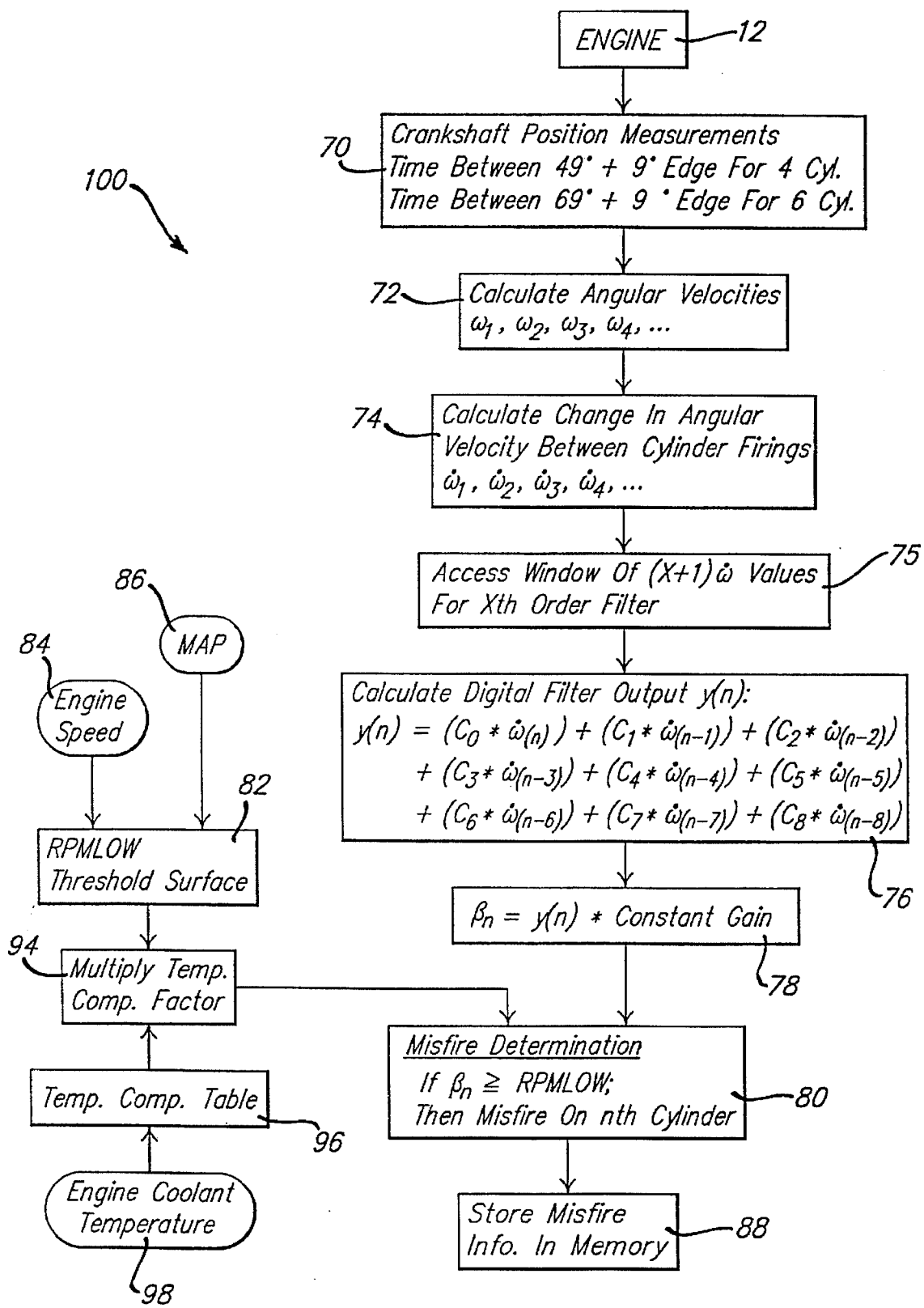
FIG. 3 is a detailed flow chart illustrating the overall methodology for detecting cylinder misfires in a multi-cylinder engine with digital filtering according to the present invention.

Referring to FIG. 3, a flow chart illustrating the overall method 100 for detecting cylinder misfires of engine 12 is shown therein according to the present invention. The misfire detection methodology 100 generally begins at block 70. During operation of engine 12, crankshaft position measurements are taken over a predefined angular displacement θ of the crankshaft 20 during an expected cylinder firing for each cylinder 14 of engine 12. The position measurements are preferably obtained by measuring a time interval (T) expired during rotation of the crankshaft 20 through the predefined angular displacement θ. This is accomplished by microcontroller 52 starting a timer when crankshaft sensor 32 detects first edge 65 for a four-cylinder engine. For the four-cylinder engine application, the timer is stopped after a forty degree (40°) rotation when sensor 32 detects second edge 66. For the next cylinder firing, a timer is likewise started when crankshaft sensor 32 detects the third edge 67 and is stopped after a forty degree (40°) rotation when sensor 32 detects the fourth edge 68. For a six-cylinder engine application, the preferred timer measurements are taken over a sixty degree (60°) angular rotation interval.

The methodology 100 advances to step 72 wherein the individual time intervals (T) measured by the microcontroller 52 are used by the microcontroller 52 to calculate an angular velocity (RPM) value $\omega$ of the crankshaft for the corresponding cylinder. This is generally accomplished by dividing the angular displacement $\theta$ by the corresponding time measurement (T). The position time measurements and angular velocity calculations are continually repeated for each cylinder firing event to obtain a series of angular velocities $\omega_1$, $\omega_2$, $\omega_3$, $\omega_4$, $\omega_5$, $\omega_6$ ..., etc. corresponding to respective cylinders 1, 3, 4, 2, 1, 3 ..., for example.

The misfire detection methodology 100 proceeds to step 74 in which microcontroller 52 calculates changes in angular velocity ($\dot{\omega}$) which correspond to each expected cylinder firing event. The change in angular velocity for a current cylinder (n) is calculated by determining the difference between angular velocity for the current cylinder (n) and the following successive cylinder (n+1). According to one embodiment described herein, the following velocity is subtracted from the current velocity so that velocity changes for a misfire yield positive values. Likewise, the current velocity can be subtracted from the following velocity. The calculated changes in angular velocity are represented by $\dot{\omega}_1$, $\dot{\omega}_2$, $\dot{\omega}_3$, $\dot{\omega}_4$, etc. The angular velocity changes $\dot{\omega}$ are continually calculated from one cylinder firing event to another and may be accumulated and a consecutive series of angular velocity changes may be saved in memory 54 or calculated from stored velocity information $\omega$.

With particular reference to FIG. 4, a series of consecutive changes in angular velocity $\dot{\omega}$ are shown for a four-cylinder engine. A series of nine consecutive changes in angular velocity $\dot{\omega}_{(n-8)}$, $\dot{\omega}_{(n-7)}$, $\dot{\omega}_{(n-6)}$, $\dot{\omega}_{(n-5)}$, $\dot{\omega}_{(n-4)}$, $\dot{\omega}_{(n-3)}$, $\dot{\omega}_{(n-2)}$, $\dot{\omega}_{(n-1)}$, $\dot{\omega}_{(n)}$ are shown for respective cylinder firing events corresponding to cylinders 4 2 1 3 4 2 1 3 4. According to one embodiment of the present invention, with an X order FIR filter, a window containing a series of (X+1) consecutive angular velocity changes is used. The series includes the current change in angular velocity $\dot{\omega}_{(n)}$ for the current cylinder firing event (n) and the previous eight changes in angular velocity $\dot{\omega}_{(n-1)}$ through $\dot{\omega}_{(n-8)}$. For a finite impulse response (FIR) filter, the window containing the series of angular velocity changes includes (X+1) consecutive velocity changes for an X order filter. Accordingly, six cylinder, eight cylinder and other size engines will likewise preferably also use (X+1) consecutive angular velocity changes.

Referring back to FIG. 3, the methodology 100 accesses the window of consecutive velocity changes as provided in step 75. A digital filter output y(n) is calculated as provided in step 76. The digital filter computation provided in step 76 provides an example of an eighth order (X=8) FIR digital filter which contains nine consecutive velocity changes $\dot{\omega}_{(n)}$ through $\dot{\omega}_{(n-8)}$ and nine digital filter coefficients $C_0$ through $C_8$. The digital filter 55 is implemented in the time domain as a sum of products, where the products include individual ones of current and previous samples $\dot{\omega}$ multiplied by the corresponding programmed filter coefficients. The total number of products is proportional to the filter order and the constant coefficients are preferably generated based on a Hamming windowing design method in connection with frequency analysis. The frequency analysis, which is described in greater detail in connection with FIGS. 5–8, is preferably performed on a given size engine by analyzing real engine data in the frequency domain and is used to distinguish actual occurrences of misfires from noise, such as bobble-induced noise according to one embodiment. This is because bobble-induced noise generally occurs at lower engine speeds and the bobble-induced noise generally exhibits frequencies lower than the misfire frequencies.

The digital filter output y(n) is preferably multiplied by a constant gain to provide for a compensated filter output $\beta$ pursuant to step 78. The compensated filter output $\beta$ is used to determine the occurrence of a misfire on the current cylinder as provided by step 80 of the methodology 100. More particularly, the compensated filter output $\beta$ is compared with a predetermined threshold value (RPMLOW) to determine if a misfire has been detected. The predetermined threshold value RPMLOW is retrieved from a threshold surface of information stored in memory or a state machine. Threshold value RPMLOW is a function of engine speed and manifold pressure (MAP) and can be retrieved from a mapped surface. The RPMLOW threshold value is determined by looking up the engine speed 84 and manifold pressure 86 as presented during the misfire determination for the current cylinder firing event. Accordingly, engine speed 84 is monitored as well as manifold pressure (MAP) 86, while microcontroller 52 determines changes in engine speed.

Additionally, the retrieved RPMLOW threshold value may optionally be multiplied by a temperature compensation factor 94 in order to compensate for a cold engine condition. In doing so, current engine temperature 98 is measured and a temperature compensation factor is looked up in a compensation table 96. This compensation table factor is then multiplied by the selected RPMLOW threshold value and used as the comparison threshold value RPMLOW for misfire determination in step 80.

When a misfire event is detected, the cylinder 14 is identified by the camshaft sensor 34 and the crankshaft sensor 32 and the cylinder misfire information is stored in memory according to step 88. The accumulated misfire information may be retrieved and used to determine the cause of an engine problem. Additionally, the number of misfires may be evaluated by the microcontroller 52 to determine whether a given rate of misfire would cause premature failure of the catalyst 24. If catalyst failure is indicated, the cylinder number or identification may be recorded by microcontroller 52 and the driver warning lamp 62 can be illuminated by the lamp driver 60. Nonetheless, the driver warning lamp 62 can be illuminated to indicate the detection of one or more misfire events.

Figure 5:
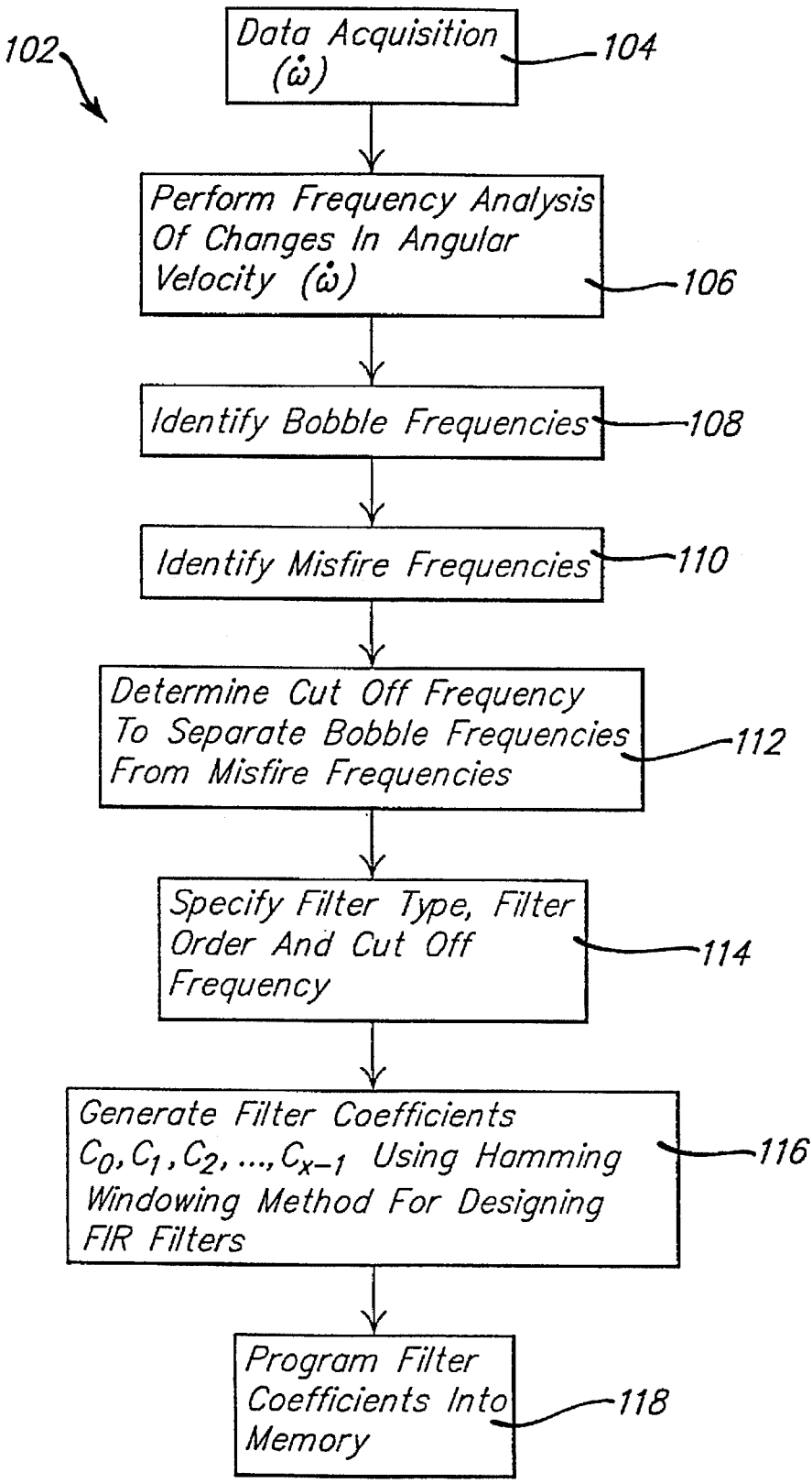
FIG. 5 is a flow diagram illustrating the generation of digital filter coefficients for use with the digital filter of the present invention.
Figure 8:
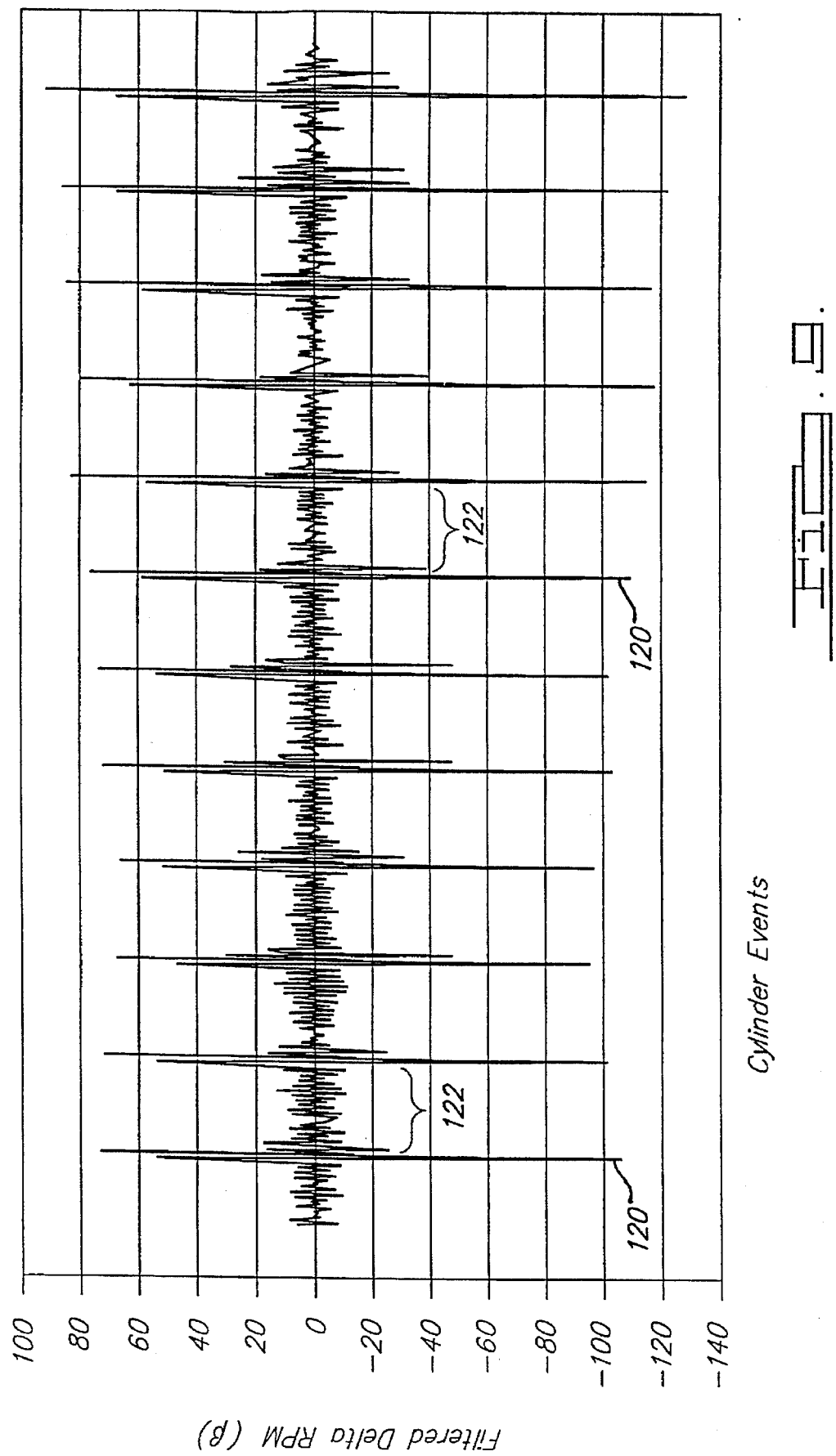
FIG. 8 illustrates the bobble-related noise signals which are filtered out with the digital filtering of the present invention.

The frequency analysis for determining the filter coefficients ($C_0$ through $C_x$) will now be described in connection with FIGS. 5 through 8. Referring to FIG. 5, the filter coefficient generation methodology 102 is performed in advance preferably for a given size engine by analyzing the frequency characteristics for the engine. The methodology 102 begins with data acquisition of changes in angular velocity as provided in step 104. The graph illustrated in FIG. 6 shows one example of changes in angular velocity $\dot{\omega}$ versus expected cylinder firing events. Reference numeral 120 identifies angular velocity changes which are due to actual misfires, while reference numeral 122 identifies angular velocity changes which are indications of noise-induced effects. Proceeding to step 106, a frequency analysis of changes in angular velocity $\dot{\omega}$ is performed.

To perform the frequency analysis, the changes in angular velocity $\dot{\omega}$ are converted to a frequency domain and the frequency response is analyzed. One example of angular velocity changes $\dot{\omega}$ in the frequency domain is illustrated by the signals provided in the graph of FIG. 7. Bobble-induced noise frequencies are identified as provided in step 108 and misfire frequencies are identified as provided in step 110. A cut off frequency is then determined so as to separate bobble frequencies from misfire frequencies as provided in step 112. Referring to FIG. 7, bobble-induced noise frequencies are generally identified as those frequencies below ten hertz, for the example provided. The approximate scaler value of ten hertz is related to engine speed and therefore will vary according to engine speed. In the same example, misfire frequencies are generally exhibited by frequencies above ten hertz. Accordingly, a cut off frequency of ten hertz may be appropriate to distinguish and separate bobble-induced noise from actual misfires for the example illustrated herein. By employing a high pass filter, low frequency, noise-related signals are filtered out. An illustration of the filtered signals in the frequency domain is provided in the graph of FIG. 8.

Referring to step 114 of FIG. 5, the filter type, filter order and cut off frequency are specified for a given filter. In accordance with well known FIR filter design techniques, the filter coefficients $C_0$ through $C_x$ are generated as provided in step 116. The filter coefficient generation may be provided with a Hamming windowing FIR filter design technique which should be understood by one skilled in the art. A more detailed discussion of the Hamming windowing design technique can be found in "FIR Windowed Filter Design Program—WINDOW", by L. R. Rabiner and C. A. McGonegal, published in IEEE Program for Digital Signal Processing, 5.2-1 to 5.2-19, IEEE Press, 1979. The predetermined filter coefficients are then programmed into memory as provided in step 118 for use in the digital filter 55 during operation of the internal combustion engine of a motor vehicle.

With the Hamming windowing FIR filter design technique, an even order FIR filter generally contains an odd number of filter coefficients. For the eighth order filter example shown herein, coefficients $C_0$ and $C_8$ are typically of equal value. Similarly, filter coefficient $C_1$ equals filter coefficient $C_7$, while filter coefficient $C_2$ equals filter coefficient $C_6$ and filter coefficient $C_3$ equals filter coefficient $C_5$. It should be appreciated that other filter coefficient design techniques may alternately be employed.

During operation, the digital filter output y(n) is continually calculated for each expected cylinder firing event. As previously mentioned, the filter output y(n) is multiplied by a constant gain as provided in step 78 of methodology 100. The constant gain amplifies the output signal to compensate for a reduced signal amplitude which may occur with digital filtering. Referring to FIG. 9, the filtered output including gain compensation is plotted in the graph as a function of the consecutive expected cylinder firing events. As is evident from the graph, the signal-to-noise ratio is substantially improved. This advantageously allows for realization of a reduced noise signal which may more easily be used to distinguish between actual misfires as represented by reference numeral 120 and noise-induced signals 122 which are clearly reduced in amplitude. Misfire determination can then be made by comparing the compensated filtered output with threshold value RPMLOW as previously discussed herein.

While one embodiment of the present invention has been described thus far in connection with a high pass FIR filtering technique for filtering out low frequency noise-induced signals such as those associated with a powertrain bobble-induced noise at low engine speeds, the teachings are also applicable to using a low pass filtering technique for filtering out high frequency noise signals at high engine speeds. For example, crankshaft torsional vibrations may be present at higher engine speeds. To handle the torsional vibration scenario, a low pass filter can be designed to reduce noise-related signals occurring at frequencies higher than the actual misfire event frequencies.

Figure 10:
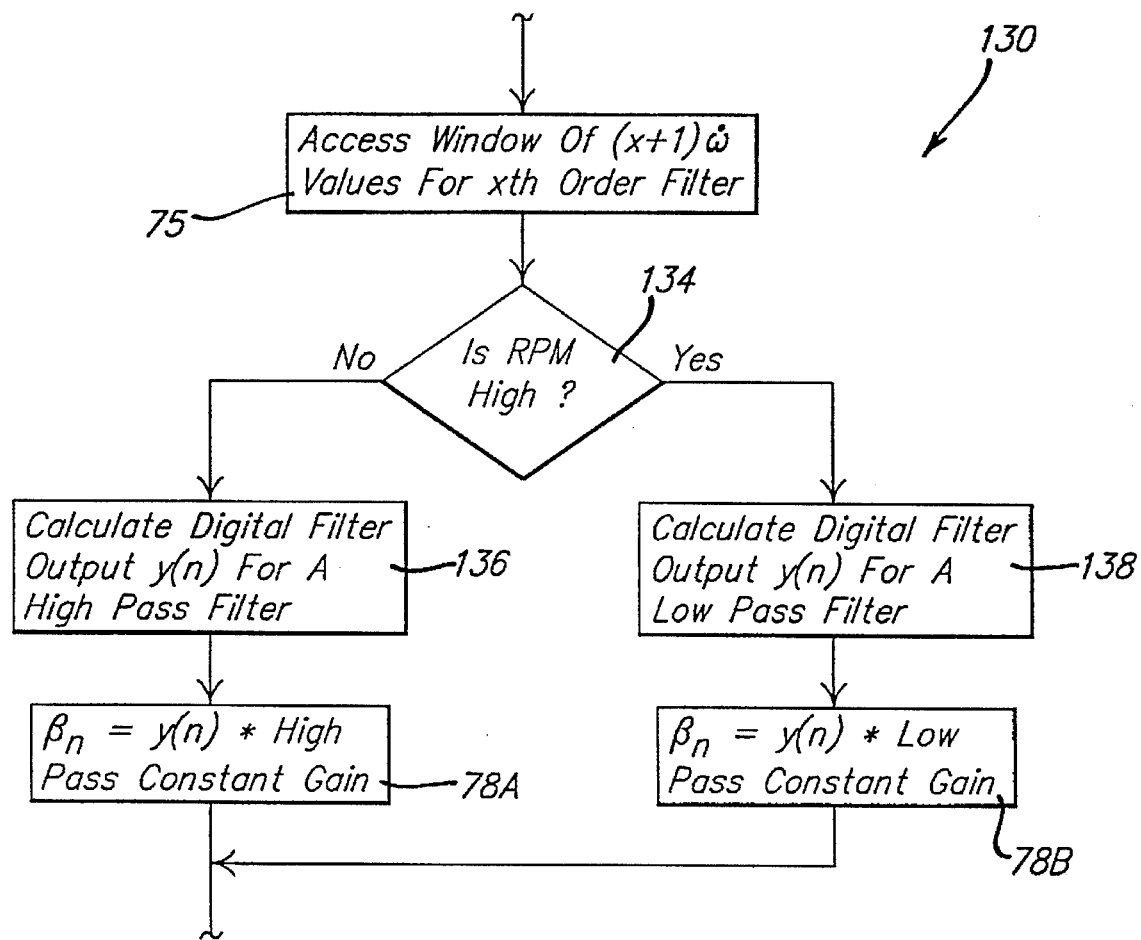
FIG. 10 is a partial flow diagram illustrating employment of a high pass filter and a low pass filter in accordance with an alternate embodiment of the present invention.

Turning now to FIG. 10, a second embodiment of the present invention is illustrated therein. The methodology 130 provided in the second embodiment of FIG. 10 replaces a portion of the steps previously provided in FIG. 3 in connection with the first embodiment. Methodology 130 of the second embodiment likewise follows the filter coefficient generation methodology 102 of FIG. 5 except bobble-noise is replaced with torsional vibration noise. Also, the methodology 130 assumes equal ordered high pass and low pass filters; however, varying ordered filters may be used. The engine speed is also monitored as provided in step 134. If engine speed is low, a digital filter output y(n) is calculated for a high pass filter so as to filter out low frequency signals as provided in step 136. If engine speed is high, a digital filter output y(n) is calculated for a low pass filter as shown in step 138. According to this approach, a high pass filter is used at low engine speeds where bobble effects are more prevalent. At high engine speeds, the low pass filter is used to filter out noise caused by torsional vibrations and other similar high frequency noise related events which are more prevalent at higher engine speeds. Accordingly, the second embodiment of the present invention is able to filter out either high frequency or low frequency noise related signals depending on the current engine speed. For the respective high pass and low pass filters, the filter output y(n) is similarly multiplied by a high pass constant gain in step 78A or a low pass constant gain in step 78B and the compensated filtered output is compared to a threshold value RPMLOW to determine if a misfire has occurred.

Figure 11:
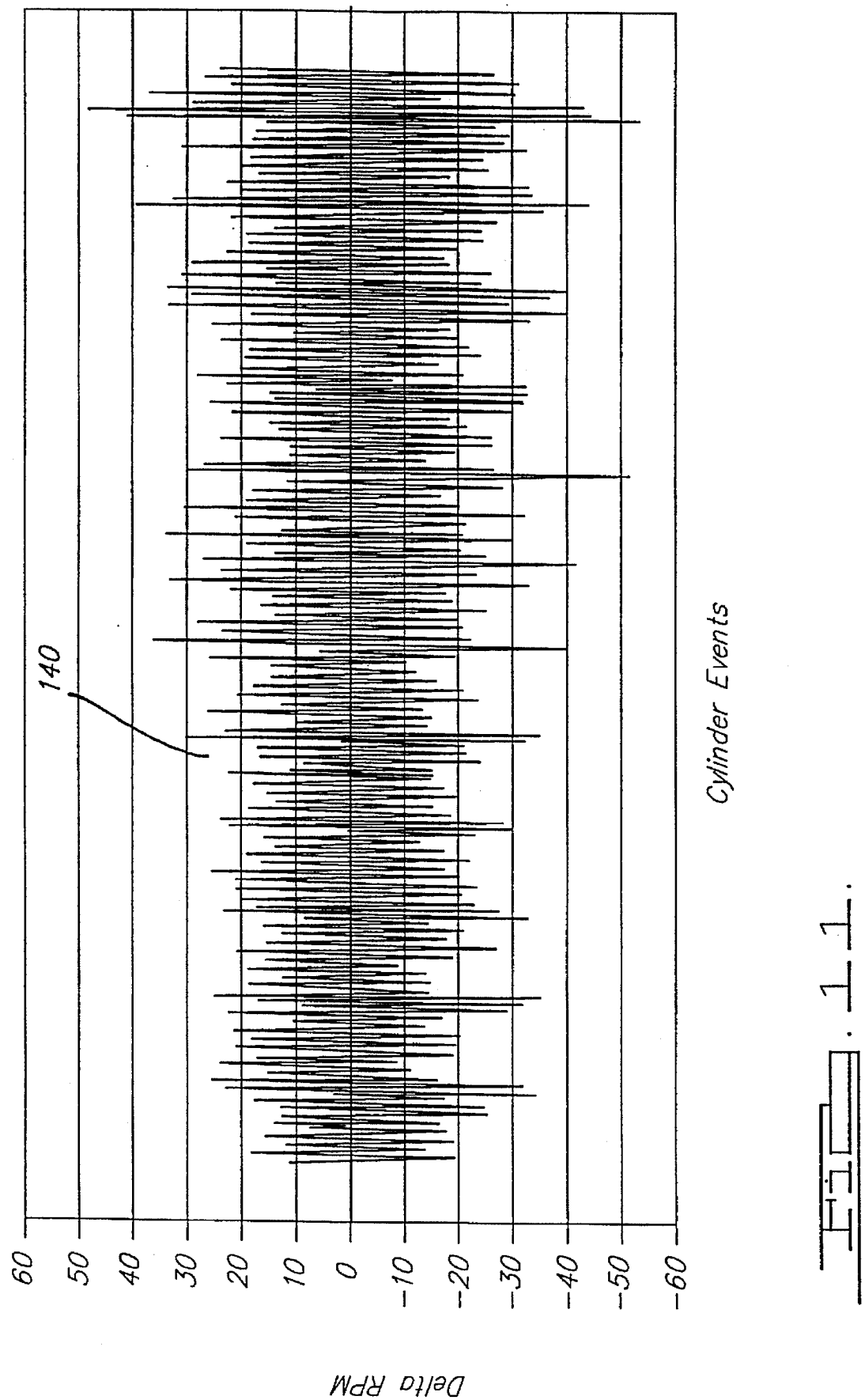
FIG. 11 illustrates a signal representing changes in angular velocity prior to filtering with the alternate embodiment.

Referring to FIG. 11, one example of a signal containing both actual misfires and high frequency noise such as torsional vibration induced noise is illustrated therein. In accordance with the frequency analysis steps, the frequency response is analyzed as provided in FIG. 12. According to the example shown, actual misfire frequencies 142 fall below one hundred hertz, while the higher frequency signals 144 are noise-related. Accordingly, in the example shown a cut off frequency of one hundred hertz may be employed to effectively separate the noise from the actual misfire signals. With particular reference to FIG. 13, the compensated filter output β is illustrated with the high-frequency noise substantially filtered out in accordance with the present invention. As shown, the signal-to-noise ratio is greatly enhanced to more easily distinguish an actual misfire event from noise-related signals.

While specific embodiments of the invention have been shown and described in detail to illustrate the principles of the present invention, it will be understood that the invention may be embodied otherwise without departing from such principles. For example, one skilled in the art will readily recognize from such discussion and from the accompanying drawings and changes that various changes, modifications and variations can be made therein without departing from the spirit and scope of the present invention as described in the following claims.

What is claimed is:

1. An apparatus for detecting misfire in individual cylinders of an internal combustion engine in a motor vehicle, comprising:

means for sensing rotation of a crankshaft;

measuring means connected to the sensing means for determining changes in angular velocity corresponding to each of a plurality of cylinder firings;

frequency analysis means for analyzing a frequency response of the engine in a frequency domain and determining a cut-off frequency between misfire signals and noise related signals;

digital filtering means for digitally filtering out noise related signals from the determined changes in angular velocity as a function of the cut-off frequency; and means for comparing an output of said digital filtering means with a threshold value to detect the occurrence of a misfire for a selected cylinder as a result of said comparison.

2. The apparatus as defined in claim 1 wherein said digital filtering means comprises a finite impulse response filter with programmed filter coefficients and a window of said changes in angular velocity.

3. The apparatus as defined in claim 2 wherein said finite impulse response filter comprises a high pass filter for filtering out low frequency noise-related signals.

4. The apparatus as defined in claim 2 wherein said FIR filter comprises a low pass filter for filtering out high frequency noise-related signals.

5. The apparatus as defined in claim 1 wherein said filter output is multiplied by a gain factor prior to comparison with the threshold value.

6. The apparatus as defined in claim 1 wherein said threshold value comprises a value dependent on engine speed and manifold pressure.

7. The apparatus as defined in claim 6 wherein said threshold value is stored in a look-up table.

8. An apparatus for detecting misfire in individual cylinders of an internal combustion engine in a motor vehicle, comprising:

means for sensing rotation of a crankshaft;

measuring means connected to the sensing means for determining changes in angular velocity corresponding to each of a plurality of cylinder firings;

means for analyzing frequency response of the engine in a frequency domain and determining a cut off frequency between misfire signals and noise-related signals;

means for determining filter coefficients as a function of said frequency analysis;

digital filtering means for receiving said changes in angular velocity and filter coefficients and filtering out noise-related signals from said changes in angular velocity in a real time domain so as to provide a filtered output; and means for comparing the filtered output of said filtering means with a threshold value to detect the occurrence of a misfire for a selected cylinder as a result of said comparison.

9. The apparatus as defined in claim 8 wherein said digital filtering means comprises a finite impulse response filter.

10. The apparatus as defined in claim 9 wherein said digital filtering means comprises a low pass filter for filtering out high frequency noise-related signals.

11. The apparatus as defined in claim 8 wherein said digital filtering means comprises a high pass filter for filtering out low frequency noise-related signals.

12. An apparatus for detecting misfire in individual cylinders of an internal combustion engine in a motor vehicle, comprising:

means for sensing rotation of a crankshaft and determining angular velocity;

measuring means for measuring changes in angular velocity corresponding to each of a plurality of cylinder firings;

a high pass digital filter for receiving said changes in angular velocity and filtering out low frequency noise-related signals, said high pass digital filter providing a filtered output only when low engine speed is detected;

a low pass digital filter for receiving said changes in angular velocity and filtering out high frequency noise-related signals, said low pass digital filter providing a filtered output only when high engine speed is detected; and means for comparing filtered outputs of said high pass and low pass filters with threshold values so as to detect the occurrence of a misfire for a selected cylinder as a result of said comparison.

13. The apparatus as defined in claim 12 wherein said high pass filter produces a filtered output which is multiplied by a high pass constant gain and said low pass filter produces a filtered output which is multiplied by a low pass constant gain.

14. A method of detecting misfires in individual cylinders of an internal combustion engine in a motor vehicle, said method comprising the steps of:

sensing rotation of a crankshaft;

determining changes in crankshaft velocity;

selecting one of the cylinders for detection;

analyzing a frequency response of the engine in a frequency domain and determining a cut-off frequency between misfire signals and noise-related signals;

determining filter coefficients as a function of the frequency analysis;

digitally filtering out noise related signals from said determined changes in crankshaft velocity to provide a filtered output signal;

comparing the filtered output signal with a predetermined threshold; and detecting a misfire of the selected cylinder depending on the result of the comparing step.

15. The method as defined in claim 14 wherein said step of digitally filtering comprises summing products of filter coefficients and changes in angular velocity taken from a selected window.

16. The method as defined in claim 14 wherein said step of digitally filtering comprises filtering out low frequency noise-related signals.

17. The method as defined in claim 14 wherein said step of digitally filtering comprises filtering out high frequency noise-related signals.

18. The method as defined in claim 14 wherein said step of digitally filtering comprises filtering out low frequency noise-related signals with a high pass filter only when engine speed is low and filtering out high frequency noise-related signals with a low pass filter only when engine speed is high.

19. A method for detecting misfire in individual cylinders of an internal combustion engine for a motor vehicle, said method comprising the steps of:

sensing rotation of a crankshaft;

determining changes in angular velocity corresponding to each of a plurality of expected cylinder firings;

digitally filtering out noise related signals from the determined changes in angular velocity to provide a filtered output signal;

determining a threshold value dependent on engine speed and manifold pressure; and comparing the filtered output signal with the threshold value to detect the occurrence of a misfire for a selected cylinder as a result of said comparison.

* * * * *